(12) United States Patent
Gatliff

(10) Patent No.: US 6,205,708 B1
(45) Date of Patent: Mar. 27, 2001

(54) TREATMENT MATERIAL PUMPING SYSTEM

(76) Inventor: Edward G. Gatliff, 7355 Dixon Dr., Hamilton, OH (US) 45011

(*) Notice: Subject to any disclaimer, the term of this patent is extended or adjusted under 35 U.S.C. 154(b) by 0 days.

(21) Appl. No.: 09/193,204

(22) Filed: Nov. 17, 1998

Related U.S. Application Data

(60) Provisional application No. 60/065,777, filed on Nov. 17, 1997, provisional application No. 60/075,473, filed on Feb. 20, 1998, and provisional application No. 60/066,678, filed on Nov. 26, 1997.

(51) Int. Cl.⁷ .................. A01H 3/00; A01B 79/00; A01B 79/02; B01D 15/00; B01J 39/00
(52) U.S. Cl. .................. 47/58.1; 111/200; 210/668
(58) Field of Search .................. 47/58.1; 75/710; 111/200; 210/668

(56) References Cited

U.S. PATENT DOCUMENTS

| | | | |
|---|---|---|---|
| 2,306,027 | 12/1942 | Swaney | 47/62 R |
| 3,577,678 | 5/1971 | Burton | 47/58.1 |
| 4,169,050 | 9/1979 | Serfling | 210/12 |
| 4,192,096 | 3/1980 | Platt et al. | 47/73 |
| 4,213,274 | 7/1980 | Skaife | 47/81 |
| 4,310,990 | 1/1982 | Payne | 47/59 |
| 4,839,051 * | 6/1989 | Higa | 210/602 |
| 4,855,040 | 8/1989 | Kickuth | 210/109 |
| 4,920,694 | 5/1990 | Higa | 47/58.1 |
| 4,995,969 | 2/1991 | LaVigne | 210/150 |
| 5,117,581 | 6/1992 | Green et al. | 47/87 |
| 5,266,213 | 11/1993 | Gillham | 210/747 |
| 5,269,094 | 12/1993 | Wolverton et al. | 47/62 R |
| 5,307,589 | 5/1994 | Rigsby | 47/59 |
| 5,314,638 | 5/1994 | Morine et al. | 252/184 |
| 5,362,394 | 11/1994 | Blowes | 210/617 |
| 5,442,891 | 8/1995 | Albrecht | 52/745.14 |
| 5,444,940 | 8/1995 | White-Wexler et al. | 47/82 |
| 5,453,201 * | 9/1995 | Etzel et al. | 210/668 |
| 5,476,142 | 12/1995 | Kajita | 166/294 |
| 5,618,413 | 4/1997 | Todd et al. | 210/151 |
| 5,667,673 | 9/1997 | Hogen et al. | 210/170 |
| 5,702,593 | 12/1997 | Horsley et al. | 210/122 |
| 5,733,453 | 3/1998 | DeBusk | 210/602 |
| 5,829,191 | 11/1998 | Gatliff | 47/58 |
| 5,829,192 * | 11/1998 | Gatliff | 47/58 |
| 5,907,925 | 6/1999 | Guyot | 47/58.1 |
| 5,919,367 | 7/1999 | Khudenko | 210/605 |
| 5,947,041 * | 9/1999 | Licht | 111/200 |
| 5,975,798 | 11/1999 | Liskowitz et al. | 405/128 |

OTHER PUBLICATIONS

Weiner, M., Plant a Tree. Collier Brooks, New York. p. 64–66, 70–71, 1975.*
Salt et al., Phytoremediation: A novel strategy for the removal of toxic metals from the environment using plants. Bio/Tecnology, vol. 13. No. 5. pp. 468–474, May 1995.*
Plant Physiology, Carey (Editor), Wadsworth Publishing Company, pp. 85, 87, 1978.*
Brady, The nature and properties of soils, tenth edition, MacMillan Publishing Company, pp. 17–20, 94–95, 148–150, 205–207, 1975.*
Raskin et al., Bioconcentration of heavy metals by plants, Environmental Biotechnology, 5:285–290, 1994.*
Schnoor et al., Phytoremediation of organic and nutrient contaminants, Environmental Science and Technology, vol. 29, No. 7, p. 319A–323A, 1995.*
Reactive Permeable Barrier Using Iron Colloids for the Remediation of Groundwater Contaminants, Daniel Kaplan and Kirk Cantrell, Pacific Northwest Laboratory, 1997.
Schnoor et al.; Phytoremediation of Organic and Nutrient Contaminant; Environmental Science & Technology; vol. 29, No. 7, 1995, 318–323.
Strand et al.; Removal of Trichloroethylene From Aquifers Using Trees; Innovative Technol. Site Rem. Hazard. Waste Manage., Proc. Natl. Conf.; 1995, 605–612 (Abstract Only).
Kirkman; Basic Gardening Illustrated; 1975, 1–128 (Only pp. 20, 48–53, and 122).

* cited by examiner

Primary Examiner—Bruce R. Campell
Assistant Examiner—Anne Marie Grünberg
(74) Attorney, Agent, or Firm—Lerner, David, Littenberg, Krumholz & Mentlik, LLP

(57) ABSTRACT

A remediation-assisting material or structure is arranged in the vicinity of a root system and the hole prepared for the root system. The hydraulic gradient created by the root system draws contaminated water through the remediation-assisting material or structure to enhance remediation of contaminants within the groundwater. To facilitate the establishment of a hydraulic gradient, and perhaps to concentrate the same, the hole prepared for the root system is made in such a way that surface water will not penetrate the hole and feed the root system in lieu of the root system being fed by the groundwater, as extracted by capillary action.

27 Claims, 1 Drawing Sheet

TREATMENT MATERIAL PUMPING SYSTEM

This application claims the benefit of U.S. Provisional Application Ser. No. 60/065,777, filed on Nov. 17, 1997, Provisional Application Ser. No. 60/075,473, filed on Feb. 20, 1998, and Provisional Application Ser. No. 60/066,678, filed on Nov. 26, 1997.

BACKGROUND OF THE INVENTION

The present invention is directed to phytoremediation in general, and more specifically to incorporating the use of a remediation-assisting or treatment material within a vegetation remediation system in order to enhance the remediation of contaminated soil and groundwater in the vicinity of the vegetation.

Phytoremediation refers to the use of vegetation in the remediation of contaminated soil and groundwater. It is emerging as the remediation technology of choice when it is feasible to use as a primary or secondary system. The natural ability of vegetation to clean contaminants from soil and groundwater is of great benefit to the environment and society. It is effective and relatively inexpensive to use and the natural setting created by it renders this technology highly desirable.

U.S. Pat. Nos. 5,829,191 and 5,829,192 to the inventor herein disclose unique phytoremediation techniques, as does U.S. Provisional Application Ser. No. 60/066,678, filed Nov. 26, 1997 and Ser. No. 60/075,473, filed Feb. 20, 1998. These techniques improve the remediation of contaminants by vegetation by increasing effectiveness and/or decreasing expense. These patents and applications are incorporated herein by reference as if fully set forth.

Of course, remediation technologies and techniques other than phytoremediation must also be considered as well. Many other technologies and techniques remain effective, inexpensive and in some applications necessary.

By way of example, U.S. Pat. No. 5,266,213 to Gillham describes a technique for treating contaminated groundwater in an aquifer, i.e, water from deep underground, by excavating a trench with a trench-cutting machine and placing a homogeneous mixture of sand and iron filings in the trench. The permeability of the iron-sand mixture should not be lower than that of the aquifer itself so that the flow of water is not impeded by the mixture. The iron must be placed in the trench so that no oxygen can reach it, thus the iron must be buried within the trench. Otherwise, accessibility to oxygen will rust the iron and it will become ineffective to promote the breakdown of contaminants. The iron must be exposed to the groundwater for a "residence time," about one to two days. Alternatively, a tank or pond is provided at the surface of the remediation site, and contaminated groundwater is drawn out of the soil by means of a pump and fed into the pond which contains a body of iron filings or a mixture of iron filings and sand. In either arrangement, the water slowly percolates through the iron fillings of the mixture for the residence time, and certain contaminants-halogenated-are broken down chemically.

The techniques in the Gillham patent require considerable labor, and the results and applications are limited. By way of example, it may be difficult to match the aquifer flow characteristics to prevent blockage or to channel for possible redirection of the groundwater flow. Also, there is a potential for the iron to transform and cause secondary reactions in the barrier wall or downgradient from the barrier wall that may cause the aquifer to become clogged, become contaminated with elevated levels of iron in solution or cause other reactions to occur that might prove deleterious. Moreover, there may be incomplete contaminant degradation. The Gillham system relies on the need to provide an adequate residence time for total degradation of the halogenated compounds. If that residence time changes because of changes in the groundwater flow or the physical or chemical dynamics of the iron barrier, an incomplete reaction could occur that would allow derivative contaminants to escape the iron barrier. Such derivative contaminants (e.g., vinyl chloride) could be more toxic than the contaminants which were to be treated.

The present invention marries the phytoremediation technology with other technologies for remediating contamination in soil and groundwater. In doing so, a single system can be more effective in remediating at least particular contaminants. Those contaminants not necessarily removed by any of the discrete technologies can through the use of the techniques in accordance with the present invention be removed or at least substantially removed.

SUMMARY OF THE INVENTION

The present invention relates to a method for using a tree to pump contaminated groundwater to a treatment area at which a treatment material, structure or device (broadly, "a treatment expedient") is provided to treat a contaminant, and apparatus therefor. The treatment area is at least in the area directly below or around the base of a tree, typically in or around the location of the hydraulic gradients created by the root system of a tree. The treatment expedient is disposed in and around the treatment area.

The treatment expedient used is any material or structure or device useful for the treatment of contaminants or target contaminants or for preparing contaminated water for remediation by a tree. Of course, any combination of materials, structures or devices can also be used as a treatment expedient. Treatment materials can remediate by microbial reaction, or chemical or physical reaction (including a catalytic or bonding action). Examples of treatment materials include zero valence iron, iron or other metal filings, powder or the like, ceramics impregnated with microbes, iron sesquioxide, organic compost materials (such as sphagnum peat) or a reed sedge peat, activated carbon and ion exchange resins. The treatment material could be a combination of different materials, such as sand and iron filings. A zero valence iron can treat chlorinated hydrocarbons, and other materials can be used to treat petroleum hydrocarbons, uranium and many other contaminants.

Treatment structures and devices could include the physical manipulation of the treatment area and the contaminated water therein, for instance air sparging which would remove volatile compounds (that would have to be vented out perhaps at the top of the hole) and/or oxygenate the water for improved root adsorption. Electro-osmosis or electro-ultra-filtration or other known means for electrically moving and/or separating polar compounds in solution might be used in extracting or moving specific molecules in the groundwater. These include any electrolysis type of treatment, such as those which separate $H_2O$ into $H$ and $O_2$ gases. For example, soluble lead could be drawn to the area of the roots by such a method.

Other contaminants that might prove phytotoxic could be drawn to a collection vessel (e.g., ultrafiltration) for selective removal. Such contaminants would thus be kept from the tree at least substantially so that the health of the tree could be maintained for the remediation of other contaminants. A small pump might also be used to assist in moving water through a packed resin column or column-like structure, or otherwise assist in moving water. Water from a deep aquifer might be moved to a location closer to the root system so that the root system could effectively or more effectively use the water. In such a situation, a cost-effective pump could be used since pumping will not be required for a great distance. In other applications, pumps might be used to take water away from an aquifer or tree-created reservoir, perhaps because the tree is not eliminating enough water or in order to bring that water for other processing.

Each of these treatment expedients provide a means of some treatment of contaminants or target contaminants. Of course, any type of expedient which facilitates the remediation of contaminants, whether the same contaminants to be remediated by the vegetation or other contaminants, can be used together with the vegetation in accordance with the present invention.

In a preferred embodiment, the treatment expedient is a treatment material. In a further preferred embodiment, the material is a zero valence iron. It is disposed in and/or around the treatment area which is in the vicinity of the root system of a tree. The root system of the tree increases the hydraulic gradient at and around the base of the tree such that the flow of contaminated groundwater is directed into the zero valence iron matrix or the flow is increased. A chemical reaction occurs by reason of the zero valence iron, which in effect remediates the contaminated groundwater by reducing contaminants (aiding in the degradation of chlorinated hydrocarbons or other contaminants). Any contaminants remaining in the groundwater after flowing through the matrix are accumulated, metabolized or volatilized by microbes in the root zone and by the tree. Thus, in addition to increasing the hydraulic gradient, the root system also serves a remediation purpose as well.

Other embodiments include modification of the treatment area to make it larger or smaller, or even shifted to accomodate the site or particular application. Also, the use of a liner or casing is advantageous, but not necessary. In this regard, a hard and/or flexible casing may be used, as described in more detail in U.S. Pat. Nos. 5,829,191 and 5,829,192. A cased hole will concentrate the hydraulic gradients created by the root system.

The treatment material is applied into soil and/or groundwater in a column or trench to remediate groundwater flowing into the column or trench as a result of the hydraulic gradient created by the extraction of water by trees. Significantly improved remediation is realized as compared to known technology that relies solely on natural, mechanical, electrical or other non-vegetative hydraulic gradients utilized to cause water to flow through a treatment material, structure or device in the treatment area. This system would typically be more efficient than passive systems and/or less costly than active systems used to effect groundwater contact with a treatment expedient, and in particular with treatment material in a preferred embodiment.

In accordance with an embodiment of the present invention, a treatment expedient would be placed into a column, hole or trench such that the expedient is positioned to take advantage of the natural hydraulic gradients created by the tree and its root system. This may be in, around or immediately above contaminated groundwater. A tree selected for its remedial capacity would be planted in or immediately adjacent to the hole or trench containing the expedient to allow the root system to extract water that must be exposed to or pass through the treatment expedient to be supplied to the zone of root extraction. The existence of the hole or trench would provide a preferential pathway for the water to flow to the roots thereby causing the water to be exposed to or pass through the treatment expedient. Alternatively, water can be fed to the root system in such a way this it is exposed to or passes through the treatment expedient prior to or after reaching the root system.

Variations of the arrangements of the present invention may be implemented for particular in-situ settings and for ex-situ settings. In-situ is the treatment of a contaminate media in-place, where ex-situ involves the removal of the contaminant from its natural setting (i.e., pumping groundwater to a tank and treating it in the tank or elsewhere would be an ex-situ treatment). These include, for example, restricting root development to the inside of the hole by means of a casing material or where trees are used in the treatment of waste water delivered to the hole. The primary focus of any specific methodology is to ensure that the contaminated water is exposed to or drawn through the treatment expedient, preferably treatment material, as the tree extracts water to grow and survive.

An example of an ex-situ system in accordance with the present invention would be where waste water from industrial processes is delivered into the base of a lined trench filled to a certain level with a treatment expedient, preferably a material. Trees arranged and growing above the expedient would use/treat the waste water. The trench dimensions would be sized to ensure that the tree was capable of handling the flow of waste water. This approach would apply to conditions where treated waste water could not be disposed of, i.e., discharged to the environment or otherwise, such as when other contaminants are present that would not be affected (fully remediated) by the treatment expedient alone or when the treatment process is not complete enough and further processing is required.

The establishment of the treatment expedient, and in particular a treatment material, in the vicinity of the root system of a tree used for remediation need not be in the ground itself. Columns filled with earth or any rooting medium and located out of the ground could be used. Examples are set forth and discussed in U.S. Pat. Nos. 5,829,191 and 5,829,192, as well as in U.S. Provisional Application Ser. No. 60/066,678, filed Nov. 26, 1997.

Still further, a flow meter could be arranged anywhere in the vicinity of the treatment expedient in order to provide a means for monitoring the usefulness of the treatment expedient in order to provide a means for monitoring the usefulness of the treatment expedient, and to gauge the hydraulic gradient in the area of the treatment expedient. Here, reference is made to U.S. Provisional Application Ser. No. 60/075,473 filed Feb. 20, 1998.

Objects and advantages of the present invention can be realized by performing a method which includes the steps of providing a tree with a root system, providing a treatment expedient and arranging the treatment expedient and the root system such that water directed to the root system is exposed to the treatment expedient. Of course, in one embodiment, this method could include the step of creating a cavity in the earth and planting the tree with its root system within that cavity. However, it could relate to providing a cavity which is not created in the earth, but rather in an external manner. In a preferred embodiment, the cavity is elongate such that a long and narrow root system can be established or continue to grow.

In a preferred embodiment, the treatment expedient is provided directly below the root system of the tree. In one embodiment of the invention, the treatment expedient is a treatment material through which the water will pass. The treatment material may be any suitable treatment material, or even a combination of materials, structures and/or devices. In one embodiment, the treatment material is a zero valence iron.

In another embodiment of the invention, the step of monitoring the flow of water within or in the vicinity of the treatment expedient or the treatment material can be practiced.

In another embodiment of the present invention, the invention includes the steps of providing a pump and pumping water from one location below the tree to a location better suited for uptake into the root system or through a treatment material. This typically would be where the hydraulic gradients created by the root system of the tree are greater at the second location than at the first location. That system may include a treatment material in addition to the pump itself. It may further include a resin column and the step of placing the resin column below the tree and pumping the water through the resin column. The water can be pumped through the resin column by the natural pump or hydraulic gradients created by the tree, or in the case of a packed resin column, the pump itself could be used to force the water therethough. In any case, the pump provided is used to deliver the water to a more suitable area for taking advantage of the hydraulic gradients created by the tree.

In another embodiment of the present invention, the invention includes a step of establishing a substantially liquid-impervious boundary for the cavity such that the root system of the tree grows substantially within the cavity. In this scenario, the liquid-impervious boundary keeps rain or other surface water from entering the cavity, or requiring the root system to seek out water from lower depths. The step of establishing a substantially impervious boundary includes lining the cavity with a substantially liquid-impervious material. In this system, the treatment expedient can be provided directly below the root system.

Objects and advantages of the present invention may also be realized by performing a method including the steps of creating a cavity for the growth of the root system of a tree, at least partially filling the cavity with a rooting medium, providing a tree with a root system, planting the tree by placing the root system of the tree at least partially into the rooting medium, providing a treatment expedient, and placing the treatment expedient in the vicinity of the root system such that water directed to the root system is exposed to the treatment expedient. In another aspect of this embodiment, the treatment expedient comprises a treatment material, and the water passes through the same. The treatment expedient or the treatment material can be provided directly below the root system. In a preferred embodiment, the treatment material is a zero valence iron.

Again, the cavity can be created in the earth and the treatment expedient could be provided directly below the root system. Of course, other variations for providing a cavity can be utilized, and the treatment expedient can be provided in areas other than directly below the root system. The cavity, whether created in the earth or not, can be lined with a rigid liner, a flexible liner or both, where the flexible liner would be inside the rigid liner in the later instance. Again, within the cavity as lined, the treatment expedient could comprise a treatment material, preferably a zero valence iron. The method could also include the step of monitoring the flow of water in or around the treatment expedient or the treatment material.

Water to be remediated can be supplied from the top of the cavity, whereby the water developed for feeding the tree and its root system would not be drawn into the area of the root system by a root system initiated hydraulic gradient. This arrangement is often prevalent where the cavity is created externally of the earth. It could be a single cylinder or many cylinders, either established by providing a plurality of tubes, preferably elongate, or bored into a larger mass of material, preferably a cube of a material having insulative properties. The same features of the invention expressed above and hereafter can be used in connection with such a system.

The objects and advantages of the present invention can also be realized by providing a tree remediation system which comprises a tree having a root system, a rooting medium, and a treatment expedient arranged in the vicinity of a root system such that water directed to the root system is exposed to the treatment expedient. Again, the various features and permutations of the invention discussed above and below can be incorporated within such a tree remediation system.

In any of the above instances, the cavity can be provided in an elongate form so that long and sometimes narrow root systems are established or continue to develop.

BRIEF DESCRIPTION OF THE DRAWINGS

The above and other objects and advantages of the present invention will become apparent as will a better understanding of the concepts underlying the present invention by reference to the description which follows and refers to the accompanying FIG. 1 which is a schematic representation of a cross-section of earth in the vicinity of a tree planted for remediation of contaminated soil and/or groundwater, and depicting a treatment expedient 20.

DETAILED DESCRIPTION OF THE INVENTION

Figure 1:
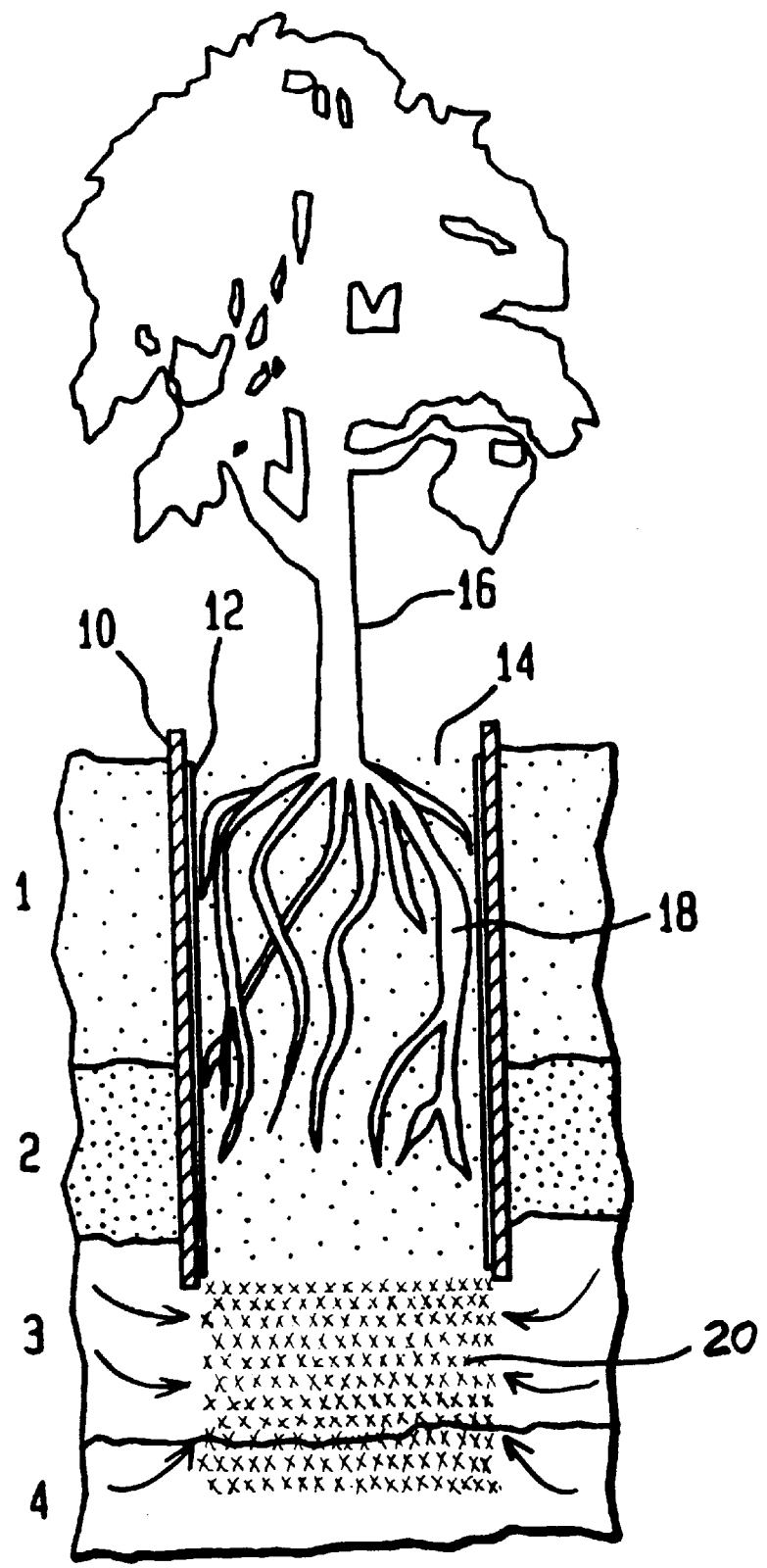

The present invention relates to the planting of vegetation for the purpose of facilitating the remediation of contaminated soil or groundwater. The terms "vegetation" and "trees" are used interchangeably to refer to any plant, plant species, cutting or the like which may be suitable for use in connection with the remediation of contaminated soil or groundwater. The term "soil" as used herein shall refer to any soil media including media made up of gravel, sand and/or soil or other soil-like materials. The term "rooting medium" as used herein shall refer to any media or mixtures of media suitable for root growth and development, and includes soil, peat, other organic matter, synthetic materials and synthetic/organic blends. A preferred rooting medium is a reed sedge peat, such as that offered by Dakota Peat & Equipment of Grand Forks, N.D. Such peat is more highly decomposed than most peats, making it more stable in soil (if so mixed), has a high level of microbial activity and is light in weight. It is also hydrating or hydrophillic.

Referring to FIG. 1, a hole, preferably a cylindrical hole, is drilled or prepared through the various layers of earth to reach a contaminated aquifer or soil layer. By way of example, in FIG. 1, these layers include the vadose layer 1 (generally, unsaturated soil), the capillary fringe layer 2 (water is drawn into micropores of soil by capillary action), the upper aquifer layer 3, and the lower aquifer layer 4, the aquifer layers generally being referred to as "the aquifer." The capillary fringe 2 includes saturated or at least partially saturated soil, as water is drawn into the micropores of the soil by capillary action. It is from this layer that the roots extract the water. Greater details respecting the various layers can be found in U.S. Pat. Nos. 5,829,191 and 5,829,192.

In a preferred embodiment in FIG. 1, the hole is lined with a hard casing 10 and a flexible casing 12. These liners are optional, and details relating to them are set forth in the above patents. The rooting medium or fill 14 surrounds the root system 18 of tree 16. Again, the above patents discuss the technique of growing long root systems, and the advantages of doing so. The present invention does not rely on long root systems and expedients for the establishment of the same. However, in a preferred embodiment, techniques and expedients for establishing long and narrow root systems are used.

Below the root system, and shown in the aquifer is a treatment expedient 20. As shown by the arrows surrounding the treatment expedient 20, the groundwater in the vicinity of the hole is drawn to the bottom of the hole, thus drawing a higher concentration of contaminants at the base of the tree 16. The root system 18 of the tree 16 acts much like a natural vacuum or pump, pulling water from all directions, not just laterally, towards the base of the tree. This occurs through capillary action, a phenomenon explained in the above patents. As the capillary action, which in essence establishes a negative pressure, holds the water into the vicinity of the root system 18, capillary pores or micropores are created in the areas below the hole and in that vicinity, and thus more water can be drawn into the pores or micropores in those areas.

The result, therefore, of placing the treatment expedient 20 in a location at the vicinity of the bottom of the hole or base of the tree is that the water being used by the root system 18 will flow through the treatment expedient. Thus, the placement of a expedient material in this location can be of great assistance in the further remediation of contaminated groundwater.

In the preferred embodiment, the treatment expedient 20 is located directly below the hole or at the base of the tree 16 and its root system 18. This location is preferred since the hydraulic gradients created by the capillary action initiated to feed root system 18 are necessarily present in this vicinity. However, it is contemplated that the treatment expedient 20 can be placed in other locations in the vicinity of the root system 18, whether or not a lined hole is established.

The treatment expedient 20 could be any device, structure or material which facilitates the remediation of contaminants from contaminated soil or groundwater or readies the groundwater for more effective remediation of contaminants by the tree. The treatment expedient 20 takes advantage of the hydraulic gradient created in the vicinity of the root system 18 and in particular below the root system 18.

In a preferred embodiment, the treatment expedient is a treatment material at least in part. The preferred treatment material at this time is a zero valence iron, which is a processed form of iron and the size of the particles making up the iron can vary, depending upon flow requirements, site requirements and application requirements. Zero valence iron in a processed form is available from Cercona of America, Inc., of Dayton, Ohio. Another preferred treatment material is in organophillic peat, such as a sphagnum peat which is organic and hydrophobic. It can be used as a filter-type of treatment material whereby it separates organics and water, such as where benzene is in water. Other peat-based materials, such as reed sedge peat, which is hydrophillic or hydrating, is expected to also separate organics and water.

A treatment expedient might be a particular structure of any material, the structure itself facilitating remediation either by collection of contaminants or readying the contaminated water for uptake through the tree's root system and the rooting medium. The trees draw in surrounding contaminated water. And since the area affected is so localized, it allows for treatment of only or primarily contaminated water. Alternatively, the combination of a particular structure and a remediation-assisting compound or substance can be used as well. Filtration-type systems or arrangements are contemplated, whereby any particulate, filter or matrix of a compound or substance will assist in the remediation of the contaminated groundwater or at least ready the contaminated groundwater for uptake into the root system 18.

By way of example, a small pump or other mechanical device might be placed at 20, or in that vicinity, in the base of the hole to force water through a resin column or column-like construction at the base of the hole. Resin columns can be created to be fairly selective for the type of contaminant that can be separated from solution. Also, the resin material need not be packed in a column whereby a pump might not be needed to pass the water through the column or column-like structure. Instead, the resin material could be injected into a cell that we could place at the surface of the aquifer where the pumping action of the tree alone would effect the drawing of water through the cell in a passive manner.

Further, the cell could be configured in such a way as to allow the resin to be removed by flushing water through an input port and the resin and flushed water would be forced through an output port to the surface. Replacement resin could be poured back into the cell through one of the ports depending on how the system is configured. Any suitable configuration is contemplated. Certain phytotoxic or other contaminants could thus be treated.

The value to using a mechanical device such as a pump in conjunction with the trees is that the trees would be continually drawing water to the region of the pump through transpiration. The additional value to such a technique is that the water would not have to be pumped to the surface and would therefore require a more modest lift capacity, thus enabling the use of a smaller, more cost-effective pump.

Another configuration could be to place a small pump and resin column (or other pretreatment or total treatment materials) in a PVC tube (piezometer) into the aquifer through the tree column. This would allow the pump and treatment system to be accessed and replaced as necessary. The pump would only have to pump a couple of feet of lift to where the treated water could be injected into the capillary fringe or an artificial aquifer created at a higher point in or around the tree column that connects to the capillary fringe used by the tree roots. A technique employing a cased hole in accordance with U.S. Pat. Nos. 5,829,191 and 5,829,192 could be improved in situations where a deeper aquifer is out of practical reach by the root system. There, a much smaller pump can be used since only 10 feet of lift is needed as compared to versus 30 or 40 feet of lift.

Unless a pump or other mechanical assistance is employed, the depth of groundwater should be shallow enough for the roots to develop to the capillary fringe (the zone above the aquifer where water is drawn upward by capillary action of the soil micropores). This depth could be as deep as 50 feet or even 100 feet below the ground surface for some species of trees. The vertical extent of the aquifer could be treated provided a void (hole or otherwise) could be created through the entire vertical column of the aquifer in which the treatment material could be placed and provided that the void allowed for preferential flow of the water to the root system. As the roots extract water from the area above the void, a hydraulic gradient would be created causing water to flow into the treatment area through the entire vertical extent. Where a material is used, depending on the setting, the texture and consistency (including the size of particles) of the treatment material may also require selection to allow for preferential flow of water or other criteria.

There are of course advantages to utilizing a liner or casing in the hole in which the tree 16 will grow. Rain or other surface water infiltrates into the vadose zone 1 but is kept out of the hole by the casing, which could constitute the hard casing 10, the flexible casing 12, a combination of both. Of course, any other expedient could be used to prevent or substantially prevent such surface water from entering the hole in which the root system 18 is growing. For instance, in areas where the vadose zone[1] is made up of highly compacted soil or clay or other like earth, there may not be any need for a casing. Likewise, if all or a substantial amount of surface water is directed away from the area of the tree, little or no surface water will reach the vadose zone at all. In any event, the concept is to prevent or substantially prevent the non-targeted water, i.e., the surface water, from feeding the root system; whereby the roots would be fed only by the contaminated groundwater.

In general, water is extracted from the capillary fringe by the tree roots, creating a hydraulic gradient, which in turn causes the inflow of contaminated groundwater into or in the area of the treatment expedient, in a preferred embodiment an iron matrix, degrading the contaminants in the contaminated groundwater. Remaining contaminants are accumulated, metabolized or volatilized by microbes in the root zone and by the tree.

While the size of the hole in length and diameter or width is largely dependent upon the site applications and the vegetation to be used, typically the hole would be 4 to 12" in diameter and range in depth from one to one hundred feet. Of course, as set forth above, the hole need not be in the ground at all, but rather could be any cavity established for the growth of a tree. This could be in the form of piping, holes formed in blocks of material, etc. As long as the rooting medium can be maintained within the cavity for root growth, a treatment expedient can be used in conjunction therewith. See, for instance, those arrangements disclosed in U.S. Pat. Nos. 5,829,191 and 5,829,192, as well as U.S. Provisional Application Ser. No. 60/066,678. In such situations, water can be drawn from the bottom of a cavity and at least exposed to a treatment expedient as the water is being pulled towards the root system. Alternatively, the water can be provided through the top of the cavity, be exposed to the root system and the rooting medium first, and any unused water will subsequently reach the treatment expedient.

To monitor the activity at the base of the tree and within or around the treatment expedient, samples of water can be taken from locations surrounding and in the treatment expedient. The samples of water are taken in any conventional manner. Another way to monitor the system is to utilize a flow meter or lysimeter at any appropriate location around the base of the tree. The location might be within the treatment expedient, below the treatment expedient, around the treatment expedient or above the treatment expedient. The flow meter would provide flow data under one or more trees, whereby flow could be monitored and the concentration of the contaminated groundwater tracked. Also, the hydraulic grading could be monitored in this manner to determine whether the grading is too low or too high, in order to ascertain how to modify the system for better remediation. Details relating to the use of a flow meter or lysimeter are presented in U.S. Provisional Application Ser. No. 60/075,473, filed Feb. 20, 1998. That provisional application is incorporated herein by reference as if fully set forth.

All the foregoing description concerns preferred embodiments of the various techniques, materials and devices in accordance with the present invention, it should be appreciated that the invention also covers various permutations of the foregoing described features, and that certain modifications may be made and/or encouraged to be made in the foregoing without departing from the spirit and scope of the present invention which is defined by the claims set forth immediately hereafter.

What is claimed is:

1. A method of treating a contaminant in groundwater from an aquifer, comprising the steps of:
   a. identifying a contaminant to be treated;
   b. preparing a hole through soil layers in the earth to expose an aquifer having a contaminated groundwater therein;
   c. planting a tree with a root system in said hole in soil so as to develop a treatment area defined by the hydraulic gradient established by the root system, the hydraulic gradient being dependent upon the tree's use of water;
   d. selecting a treatment material, structure or device in addition to the soil to assist in the treatment of the identified contaminant in the aquifer; and
   e. arranging the treatment material, structure or device in the treatment area such that water pumped to the root system by the hydraulic gradient of the tree root system is exposed to the treatment material, structure or device before the water is used by the tree via its root system, whereby the treatment material, structure or device treats the identified contaminant from the aquifer.

2. The method in claim 1, wherein the treatment material, structure or device is provided directly below the root system.

3. The method in claim 2, wherein the treatment material, structure or device is a treatment material.

4. The method in claim 3, wherein the treatment material is zero valence iron.

5. The method in claim 3, further comprising the step of monitoring the flow of water through the treatment area.

6. The method of claim 2, further comprising the step of monitoring the flow of water through the treatment area.

7. The method of claim 6, wherein the treatment material, structure or device is provided directly below the root system, the method further comprising the steps of providing a pump and pumping water therewith from a first location below the tree to a location wherein the hydraulic gradients created by the tree are greater than in the first location.

8. The method in claim 7, further comprising the steps of providing a resin column, placing the resin column below the tree, and pumping water through the resin column.

9. The method in claim 1, wherein only a single tree is planted in the cavity, and further comprising the step of establishing a substantially liquid impervious boundary for the cavity such that the root system of the single tree grows substantially within the cavity.

10. The method in claim 9, wherein the step of establishing a substantially impervious boundary includes lining the cavity with a substantially liquid impervious material, and wherein the treatment material, structure or device is provided directly below the root system.

11. A method of treating a contaminant in groundwater from an aquifer comprising the steps of:
   a. identifying a contaminant to be treated;
   b. creating a cavity in the earth to expose an aquifer having a contaminated groundwater therein and to provide for the growth of the root system of a tree;
   c. at least partially filling the cavity with a rooting medium;
   d. providing a tree with a root system so as to develop a treatment area defined by the hydraulic gradient established by the root system, the hydraulic gradient being dependent upon the tree's use of water from the contaminated aquifer;
   e. planting the tree by placing the root system of the tree at least partially into the rooting medium;
   f. selecting a treatment material, structure or device to treat the identified contaminant in the aquifer; and
   g. placing the treatment material, structure or device in the treatment area such that water pumped to the root system by the hydraulic gradient of the tree root system is exposed to the treatment material, structure or device before the water is used by the tree via the root system, whereby the treatment material, structure or device treats the identified contaminant from the aquifer.

12. The method in claim 11, wherein the treatment material, structure or device is a treatment material and the treatment material is provided directly below the root system.

13. The method in claim 12, wherein treatment material comprises zero valence iron.

14. The method in claim 11, wherein the treatment material, structure or device is provided directly below the root system.

15. The method in claim 14, wherein the sides but not the bottom of the cavity are lined with a rigid liner, a flexible liner or both, and further comprising covering the cavity in the earth to substantially prevent surface water from entering the cavity.

16. The method in claim 14, wherein the treatment material, structure or device is a treatment material.

17. The method in claim 16, wherein the treatment material comprises zero valence iron.

18. The method in claim 16, further comprising the step of monitoring the flow of water in or around the treatment material.

19. The method in claim 11, further comprising the step of supplying water from the top of cavity.

20. The method in claim 19, wherein the treatment material, structure or device is a treatment material and the treatment material is provided directly below the root system.

21. A system comprising a tree having a root system in a cavity reaching contaminated groundwater in an aquifer treatment area defined by a hydraulic gradient established by the root system, the hydraulic gradient being dependent upon the tree's use of water from the contaminated aquifer, a rooting medium, and a treatment material, structure or device arranged in the treatment area such that water drawn to the root system by the hydraulic gradient of the tree root system is exposed to the treatment material, structure or device prior to the water being used by the tree via its root system, whereby the treatment material, structure or device treats a targeted contaminant in the water.

22. The method in claim 9, further comprising covering the cavity in the earth to substantially prevent surface water from entering the cavity.

23. The system in claim 21, further comprising a liner in and a cover for the cavity.

24. The method in claim 1, further comprising a step of surrounding the root system with a rooting medium, and wherein the step of arranging the treatment material, structure or device comprises providing the treatment material, structure or device directly below the root system and substantially separate from the rooting medium.

25. The method in claim 11, wherein the treatment material, structure or device is placed directly below the root system and separate from the rooting medium.

26. The method in claim 1, further comprising the step of providing a rooting medium, having no treatment material therein wherein the step of planting the tree comprises the step of planting the tree so that the root system of the tree is surrounded by the rooting medium with no treatment material therein.

27. The method in claim 1, wherein the step of creating a cavity in the earth comprises creating the cavity such that water from an aquifer is drawn to the root system by the hydraulic gradient created by the tree root system.

* * * * *

UNITED STATES PATENT AND TRADEMARK OFFICE
CERTIFICATE OF CORRECTION

PATENT NO. : 6,205,708 B1
DATED : March 27, 2001
INVENTOR(S) : Edward G. Gatliff It is certified that error appears in the above-identified patent and that said Letters Patent is hereby corrected as shown below:

Column 2,
Line 18, "can through" should read -- can, through --
Line 19, "invention be" should read -- invention, be --
Line 44, "agnum peat)" should read -- agnum peat or a reed sedge peat), --
Line 52, "instance air" should read -- instance, air --

Column 3,
Line 12, "provide" should read -- provides --

Column 8,
Line 59, delete "versus"

Column 9,
Line 11, "of course" should read -- , of course, --
Line 15, "12, a", should read -- 12, or a --
Line 38, "4" should read -- 4" --

Column 10,
Line 64, "the cavity" should read -- the walls of the cavity --
Line 67, "includes" should read -- comprises --

Column 11,
Line 1, "cavity" should read -- walls of the cavity --

Signed and Sealed this

Twenty-fifth Day of December, 2001

Attest:

JAMES E. ROGAN
Attesting Officer   Director of the United States Patent and Trademark Office